No. 791,030.

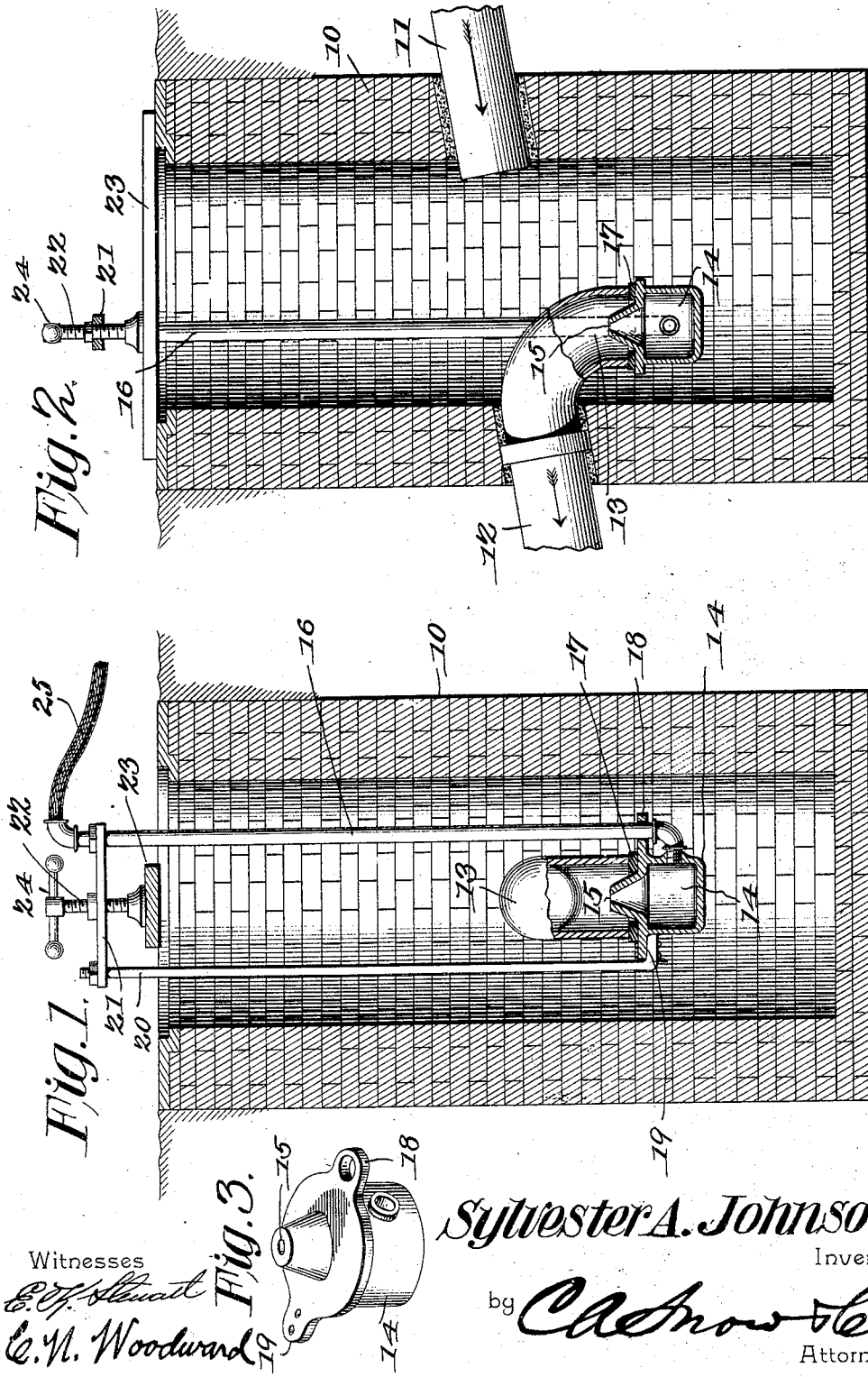

Patented May 30, 1905.

UNITED STATES PATENT OFFICE.

SYLVESTER A. JOHNSON, OF LINCOLN, NEBRASKA.

DEVICE FOR FLUSHING SEWER-TRAPS.

SPECIFICATION forming part of Letters Patent No. 791,030, dated May 30, 1905.

Application filed December 10, 1904. Serial No. 236,389.

*To all whom it may concern:*

Be it known that I, SYLVESTER A. JOHNSON, a citizen of the United States, residing at Lincoln, in the county of Lancaster and State of Nebraska, have invented a new and useful Device for Flushing Sewer-Traps, of which the following is a specification.

This invention relates to devices for flushing sewer or drainage traps and removing clogs or obstructions therefrom, and has for its object to provide a simply-constructed and efficient device which may be quickly coupled to the discharge of the trap and through which a supply of water or other liquid under pressure may be caused to pass.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a transverse section, and Fig. 2 is a longitudinal section, of a sewer or drain trap with the improved flushing device applied. Fig. 3 is an enlarged perspective view of the improved pressure-chamber detached.

The improved device may be applied to any of the various trap structures wherein a downwardly-opening elbow is employed at the intake end of the discharge-pipe, and for the purpose of illustration an approved form of such a device is shown, comprising a well-like brick or stone structure 10, having the drain-pipe 11 leading in at one side and a discharge-pipe 12 leading therefrom at another side, the discharge-pipe having a downwardly-opening elbow 13 connected to its intake end and forming the "trap" to the device in the usual manner.

The trap-elbows in structures of this kind are very liable to become clogged by the large particles of matter passing through the trap, and to remove these "clogs" and free the trap and restore it to operative condition often entails a laborious operation and sometimes the destruction of a portion of the trap, and to very easily and quickly remove such clogs from the trap without injury to the same and at small expenditure of time or labor is the principal object of the present invention, which consists in a closed chamber 14, having a contracted nozzle 15 extending from one side and with means, such as a supply-pipe 16, for supplying liquid under pressure. The chamber 14 is also provided with a flexible packing-ring 17, surrounding the nozzle 15, and likewise provided with means for clamping the chamber upon the open end of the elbow, with the packing member bearing upon its rim and the nozzle extending into the elbow. By this arrangement a strong jet of water or other liquid may be forced into the elbow and with the effect of quickly clearing the same from any clogs which may have obstructed the same.

The chamber 14 is provided with laterally-extending ears 18 19, the ear 18 to receive the supply-pipe 16 and the ear 19 to support the lower end of a rod 20, the latter extending upwardly parallel to the pipe 16.

A yoke member 21 connects the rod 20 and pipe 16 above the trap structure 10 and is supplied centrally with a clamp-screw 22, the latter bearing by its lower end upon a bracket 23, extending across the trap structure and supported at its ends upon the upper side of the same. By this arrangement it will be obvious that the chamber 14 may be firmly clamped beneath the elbow 13 by rotating the screw 22 by its handle 24.

A hose 25 or other suitable conductor will be coupled to the upper end of the pipe 16 to supply the necessary water-pressure.

Any means may be employed to supply the water under pressure, such as a hydrant connection, or a special pump may be employed for that purpose; but as these form no part of the present invention they are not illustrated.

The pipe member 16 and supporting-rod 20 being easily detachable, rods and pipes of different lengths may be attached to adapt the device to traps located at different depths.

It will be seen that the clamping means include a plurality of tension rods or members 16 and 20, one of which is tubular to form a conveyer for the cleansing agent, and that the structure is otherwise such as to permit of its being transported readily from one trap to another and of being applied readily and quickly to the end of the pipe to be flushed or cleansed.

Having thus described the invention, what is claimed is—

1. A device of the class described, having a nozzle for location at the mouth of a pipe to be flushed, and a clamp including a plurality of tension members, one of which is tubular to constitute a conveyer by which a cleansing agent may be conveyed to the nozzle.

2. A device of the class described comprising a chamber having a discharge-nozzle and means for clamping the chamber against the mouth of a pipe to be flushed, said clamping means comprising a plurality of tension members, and means for applying tension thereto, one of said tension members being tubular to form a conveyer by which the cleansing agent may be supplied to the chamber.

3. A device of the class described, comprising a chamber having a discharge-nozzle, a supporting-rod connected to said chamber, a supply-pipe leading into said chamber, means operating upon said rod for clamping said chamber to the structure to be flushed with the nozzle thereof extending into the same, and means for supplying liquid under pressure to said chamber through said supply-pipe.

4. A device of the class described, comprising a chamber having a discharge-nozzle, a supporting-rod connected to said chamber, a supply-pipe leading into said chamber, a yoke-frame connecting said rod and supply-pipe, a clamp-screw operating through said yoke-frame, means for supporting said clamp-screw, and means for supplying said pipe with liquid under pressure, whereby said chamber may be clamped to the structure to be flushed with the nozzle extending into the same.

5. The combination with a drain-pipe trap having its discharge-pipe provided with a downwardly-opening elbow, a chamber having a discharge-nozzle, a supporting-rod connected to said chamber, a supply-pipe leading to said chamber, a yoke-frame connecting said rod and supply-pipe, a clamp-screw operating through said yoke and a bracket extending transversely of said trap and supported thereon and bearing beneath said clamp-screw.

In testimony that I claim the foregoing as my own I have hereto affixed my signature in the presence of two witnesses.

SYLVESTER A. JOHNSON.

Witnesses:
   Thomas A. Allred,
   Leonard D. Hatfield.